United States Patent
Isoda et al.

(10) Patent No.: US 9,343,933 B2
(45) Date of Patent: May 17, 2016

(54) ROTATING ELECTRIC MACHINE

(71) Applicant: Mitsubishi Electric Corporation, Chiyoda-ku, Tokyo (JP)

(72) Inventors: Hitoshi Isoda, Chiyoda-ku (JP); Masaya Inoue, Chiyoda-ku (JP); Shinji Nishimura, Chiyoda-ku (JP); Moriyuki Hazeyama, Chiyoda-ku (JP); Tomoya Tachibana, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 92 days.

(21) Appl. No.: 14/258,169

(22) Filed: Apr. 22, 2014

(65) Prior Publication Data

US 2015/0162790 A1 Jun. 11, 2015

(30) Foreign Application Priority Data

Dec. 9, 2013 (JP) .................................. 2013-254235

(51) Int. Cl.
*H02K 1/27* (2006.01)

(52) U.S. Cl.
CPC .......... *H02K 1/2766* (2013.01); *H02K 2201/06* (2013.01); *H02K 2213/03* (2013.01)

(58) Field of Classification Search
CPC ..... H02K 1/276; H02K 3/18; H02K 2201/06; H02K 1/2773
USPC ........................... 310/156.53, 156.58, 156.56
See application file for complete search history.

(56) References Cited

U.S. PATENT DOCUMENTS

| 7,119,507 B2 * | 10/2006 | Nishijima | H02K 1/276 310/156.15 |
| 2010/0026128 A1 * | 2/2010 | Ionel | H02K 1/276 310/156.53 |
| 2013/0270958 A1 * | 10/2013 | Takahashi | H02K 1/274 310/156.38 |

FOREIGN PATENT DOCUMENTS

| JP | 05236687 A | 9/1993 |
| JP | 3028669 B2 * | 4/2000 |

(Continued)

OTHER PUBLICATIONS

JP 3028669 B2 machine translation Sep. 14, 2015.*

(Continued)

*Primary Examiner* — Joshua Benitez-Rosario
*Assistant Examiner* — Leda Pham
(74) *Attorney, Agent, or Firm* — Sughrue Mion, PLLC; Richard Turner

(57) ABSTRACT

A rotating electric machine includes a rotor including: a rotor core divided into blocks in an axial direction, the blocks being arranged to have a phase angle therebetween in a circumferential direction, the rotor core having magnet through holes arrayed in the circumferential direction and formed in an outer circumferential region; and permanent magnets inserted into the magnet through holes. The magnet through hole includes: a magnet insertion portion into which the permanent magnet is inserted; and a non-magnetic portion provided on an outer side of the magnet insertion portion in the circumferential direction. A bridge portion is formed between the outer circumferential surface and an outer circumferential inner wall of the non-magnetic portion. A bridge angle, which is an angle between both circumferential ends of the bridge portion with a rotation center of the rotor core set as a vertex, is larger than a skew angle.

7 Claims, 9 Drawing Sheets

(56) References Cited

FOREIGN PATENT DOCUMENTS

| | | |
|---|---|---|
| JP | 2002084693 A | 3/2002 |
| JP | 2004-248422 A | 9/2004 |
| JP | 2006-060952 A | 3/2006 |

OTHER PUBLICATIONS

Communication dated Oct. 28, 2014, issued by the Japan Patent Office in corresponding Japanese Application No. 2013-254235.

* cited by examiner

ROTATING ELECTRIC MACHINE

BACKGROUND OF THE INVENTION

1. Field of the Invention

The present invention relates to a rotating electric machine including a rotor divided into a plurality of blocks in an axial direction of the rotor, which are arranged to be offset in a circumferential direction of the rotor.

2. Description of the Related Art

In a synchronous motor including an interior permanent magnet rotor having permanent magnets embedded in an outer circumferential region of a rotor core, the distribution of a magnetic field generated between a stator and the rotor is not an ideal sine wave distribution in a gap between the stator and the rotor, and magnetic saturation occurs in the rotor core due to the magnetic field. For those reasons, when the rotor is rotated, the magnetic flux distribution density in the gap between the stator and the rotor does not exhibit a smooth profile, and hence torque pulsation such as cogging torque and torque ripples occurs in the rotor. This torque pulsation may cause vibration and noise at the time of running the synchronous motor, and hence the torque pulsation needs to be minimized.

Hitherto, there has been known a rotating electric machine that is suppressed in torque pulsation (see, for example, Japanese Patent Application Laid-open No. 2004-248422). In this rotating electric machine, the rotor core is divided into a plurality of blocks in the axial direction, and the blocks are arranged to be offset in the circumferential direction so that a multi-step skew is formed in the rotor.

However, the blocks are arranged to be offset in the circumferential direction, and hence a part of the magnetic flux generated in a radially-outer side surface (for example, an N pole) of the permanent magnet of one of the adjacent blocks may flow in the axial direction and pass through a stator core of the other of the adjacent blocks, with the result that the magnetic flux may enter a radially-inner side surface (for example, an S pole) of the permanent magnet of the other of the adjacent blocks. Thus, it becomes difficult to obtain an effect of reducing the torque pulsation at a skew angle to be derived theoretically. Further, the magnetic flux passing through the stator core is reduced, thus leading to a problem in that the torque reduction of the rotating electric machine becomes significant.

SUMMARY OF THE INVENTION

The present invention provides a rotating electric machine capable of reducing torque pulsation and suppressing torque reduction.

According to one embodiment of the present invention, there is provided a rotating electric machine, including a rotor, the rotor including: a rotor core divided into a plurality of blocks in an axial direction of the rotor core, the plurality of blocks being arranged to have a phase angle therebetween in a circumferential direction of the rotor core so that a stepped skew is formed in the rotor core, the rotor core having a plurality of magnet through holes arrayed in the circumferential direction and formed in an outer circumferential region of the rotor core; and a plurality of permanent magnets inserted into the plurality of magnet through holes so that an N magnetic pole and an S magnetic pole are formed alternately in the circumferential direction on an outer circumferential surface of the rotor core, in which each of the plurality of magnet through holes includes: a magnet insertion portion into which each of the plurality of permanent magnets is inserted; and a non-magnetic portion provided on an outer side of the magnet insertion portion in the circumferential direction, for suppressing sneaking of a magnetic flux from a radially-outer side surface of the each of the plurality of permanent magnets to a radially-inner side surface of the each of the plurality of permanent magnets, in which the non-magnetic portion has an outer circumferential inner wall formed along the outer circumferential surface of the rotor core so that a bridge portion is formed between the outer circumferential surface of the rotor core and the outer circumferential inner wall of the non-magnetic portion, and in which a bridge angle, which is an angle between both circumferential ends of the bridge portion with a rotation center of the rotor core set as a vertex of the angle, is equal to or larger than a skew angle, which is the phase angle between the plurality of blocks adjacent to each other.

According to the rotating electric machine of one embodiment of the present invention, the non-magnetic portions of the adjacent blocks overlap with each other in the axial direction, and the non-magnetic portions of each of the blocks are formed on the circumferentially outer side of the permanent magnet. Therefore, it is possible to suppress a situation where the magnetic flux generated in the radially-outer side surface of the permanent magnet of one of the adjacent blocks flows in the axial direction from the circumferentially outer side of the permanent magnet to enter the radially-inner side surface of the permanent magnet of the other of the adjacent blocks. Thus, the magnetic flux leakage can be suppressed, with the result that the torque pulsation can be reduced and the torque reduction can be suppressed.

DETAILED DESCRIPTION OF THE PREFERRED EMBODIMENTS

First Embodiment

Figure 1:
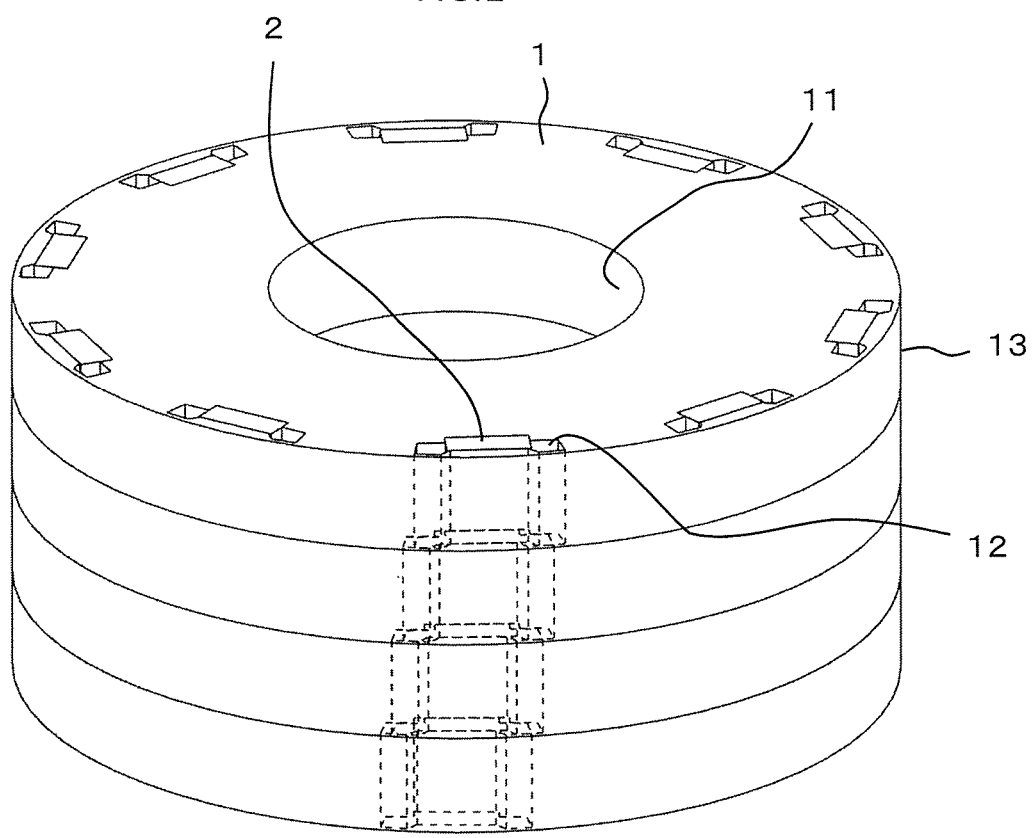
FIG. 1 is a perspective view illustrating a rotor according to a first embodiment of the present invention.
Figure 2:
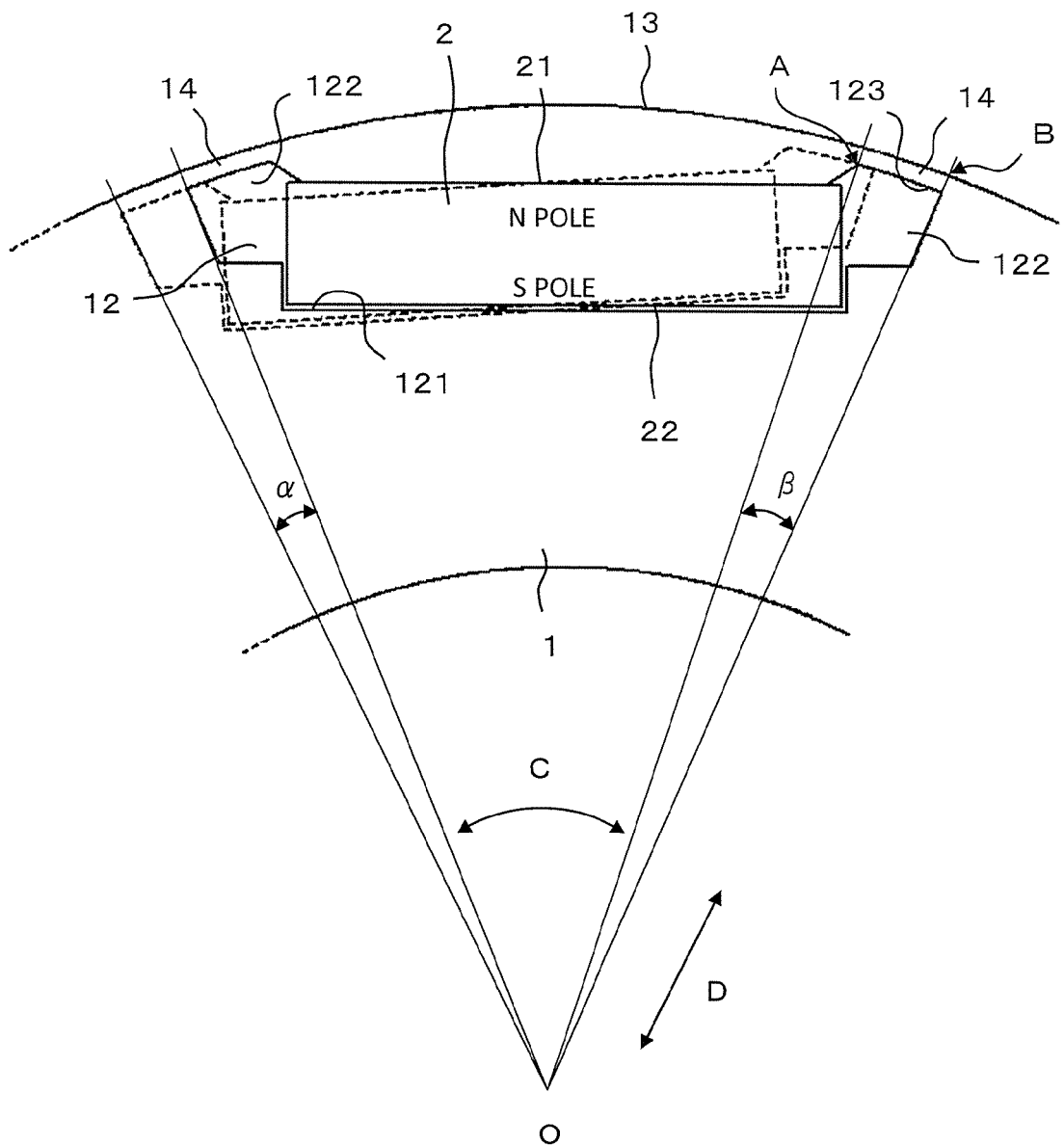
FIG. 2 is a main-part enlarged view illustrating the rotor of FIG. 1 as seen in an axial direction thereof.

FIG. 1 is a perspective view illustrating a rotor according to a first embodiment of the present invention. FIG. 2 is a main-part enlarged view illustrating the rotor of FIG. 1 as seen in an axial direction thereof. In FIGS. 1 and 2, the rotor includes a rotation shaft (not shown), a rotor core 1 formed into an annular shape and rotatable about the rotation shaft, and a plurality of permanent magnets 2 embedded in the rotor core 1.

A rotation shaft through hole 11 into which the rotation shaft is inserted is formed on a radially inner side of the rotor core 1.

The rotor core 1 is divided into a plurality of blocks in the axial direction. In this example, the rotor core 1 is divided into four-stage blocks in the axial direction. Further, the blocks of the rotor core 1 are arranged to have a predetermined phase angle therebetween in a circumferential direction of the rotor core 1 so that a stepped skew is formed in the rotor core 1. Each of the blocks is constructed by laminating thin magnetic steel sheets. In an outer circumferential region of the rotor core 1, a plurality of magnet through holes 12 arrayed in the circumferential direction are formed to extend in the axial direction.

The permanent magnet 2 is inserted into the magnet through hole 12 so that an N magnetic pole (first pole) and an S magnetic pole (second pole) are formed alternately in the circumferential direction on an outer circumferential surface 13 of the rotor core 1. In other words, two adjacent permanent magnets 2 forming the magnetic poles are inserted into the respective magnet through holes 12 so that the N pole and the S pole are inverted.

The magnet through hole 12 includes a magnet insertion portion 121 into which the permanent magnet 2 is inserted, and a pair of non-magnetic portions 122 provided on a circumferentially outer side of the magnet insertion portion 121. The non-magnetic portion 122 suppresses sneaking of a magnetic flux from a radially-outer side surface 21 of the permanent magnet 2 to a radially-inner side surface 22 of the permanent magnet 2. In this case, the circumferential direction refers to a circumferential direction of the rotor core 1, which is a direction indicated by the arrow C of FIG. 2. Further, the radial direction refers to a radial direction of the rotor core 1, which is a direction indicated by the arrow D of FIG. 2.

Among other inner walls forming the non-magnetic portion 122, an outer circumferential inner wall 123 positioned closest to the radially outer side is formed along the outer circumferential surface 13 of the rotor core 1. In other words, the outer circumferential inner wall 123 of the non-magnetic portion 122 is formed substantially in parallel to or concentrically with a part of the opposed outer circumferential surface 13 of the rotor core 1. The rotor core 1 includes a bridge portion 14 formed between the outer circumferential surface 13 of the rotor core 1 and the outer circumferential inner wall 123 of the non-magnetic portion 122.

The bridge portion 14 is necessary for securing the strength of the rotor, and the strength is secured so as to prevent a situation where a part of the rotor core 1 is broken due to the rotation of the rotor and the permanent magnet 2 therefore drops off. Further, the bridge portion 14 is formed so as to minimize a radial width thereof.

The outer diameter of the rotor core 1 and the shapes of the magnet insertion portion 121 and the permanent magnet 2 are identical among the blocks. Further, the shapes of the non-magnetic portion 122 and the bridge portion 14 are also identical among the blocks.

In FIG. 2, the permanent magnet 2 and the magnet through hole 12 corresponding to one of the adjacent blocks are indicated by the solid line, and the permanent magnet 2 and the magnet through hole 12 corresponding to the other of the adjacent blocks are indicated by the broken line.

A bridge angle $\beta$, which is an angle between both circumferential ends of the bridge portion 14 with a rotation center O of the rotor core 1 set as a vertex of the angle, is equal to or larger than a skew angle $\alpha$, which is a phase angle between the adjacent blocks (skew angle $\alpha \leq$ bridge angle $\beta$).

In this case, the bridge angle $\beta$ satisfies $\beta = \angle AOB$, where "A" represents an end of the bridge portion 14, which is positioned close to the permanent magnet 2, and "B" represents an end of the bridge portion 14, which is positioned away from the permanent magnet 2. The end of the bridge portion 14, which is positioned close to the permanent magnet 2, is hereinafter referred to as "magnetic pole center-side end of the bridge portion 14", and the end of the bridge portion 14, which is positioned away from the permanent magnet 2, is hereinafter referred to as "magnetic pole outer-side end of the bridge portion 14".

Note that, each of the magnetic pole center-side end A of the bridge portion 14 and the magnetic pole outer-side end B of the bridge portion 14 is an end of a straight line along the outer circumferential inner wall 123 of the non-magnetic portion 122, which is formed in parallel to the outer circumferential surface 13 of the rotor core 1, or an end of an arc along the outer circumferential inner wall 123 of the non-magnetic portion 122, which is formed concentrically with the outer circumferential surface 13 of the rotor core 1. When a round corner is formed at the end of the straight line or the end of the arc, the center of the round corner is set to the magnetic pole center-side end A of the bridge portion 14 or the magnetic pole outer-side end B of the bridge portion 14.

As described above, according to the rotor of the first embodiment of the present invention, the non-magnetic portions 122 of the adjacent blocks overlap with each other in the axial direction, and the non-magnetic portions 122 of each of the blocks are formed on the circumferentially outer side of the permanent magnet 2. Therefore, it is possible to suppress a situation where a magnetic flux generated at the N pole formed in the radially outer part of the permanent magnet 2 of one of the adjacent blocks flows in the axial direction from the circumferential end of the permanent magnet 2 to enter the S pole formed in the radially inner part of the permanent magnet 2 of the other of the adjacent blocks. Thus, the magnetic flux leakage can be suppressed, with the result that the torque pulsation can be reduced and the torque reduction can be suppressed.

Note that, in the above-mentioned first embodiment, description is given of the structure in which the rotor is divided into four-stage blocks, but any structure may be employed as long as the rotor is divided into blocks in two or more stages.

Second Embodiment

Figure 3:
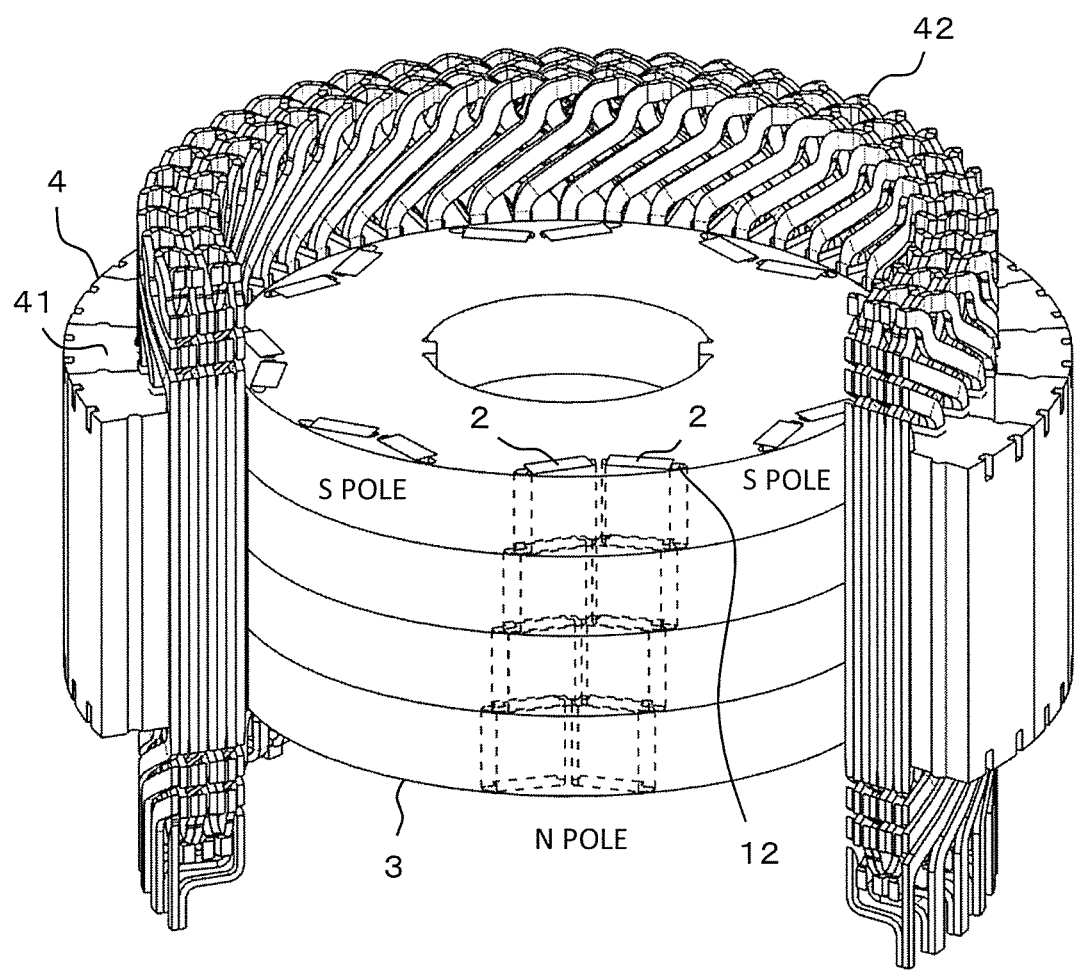
FIG. 3 is a perspective view illustrating a rotating electric machine according to a second embodiment of the present invention.
Figure 4:
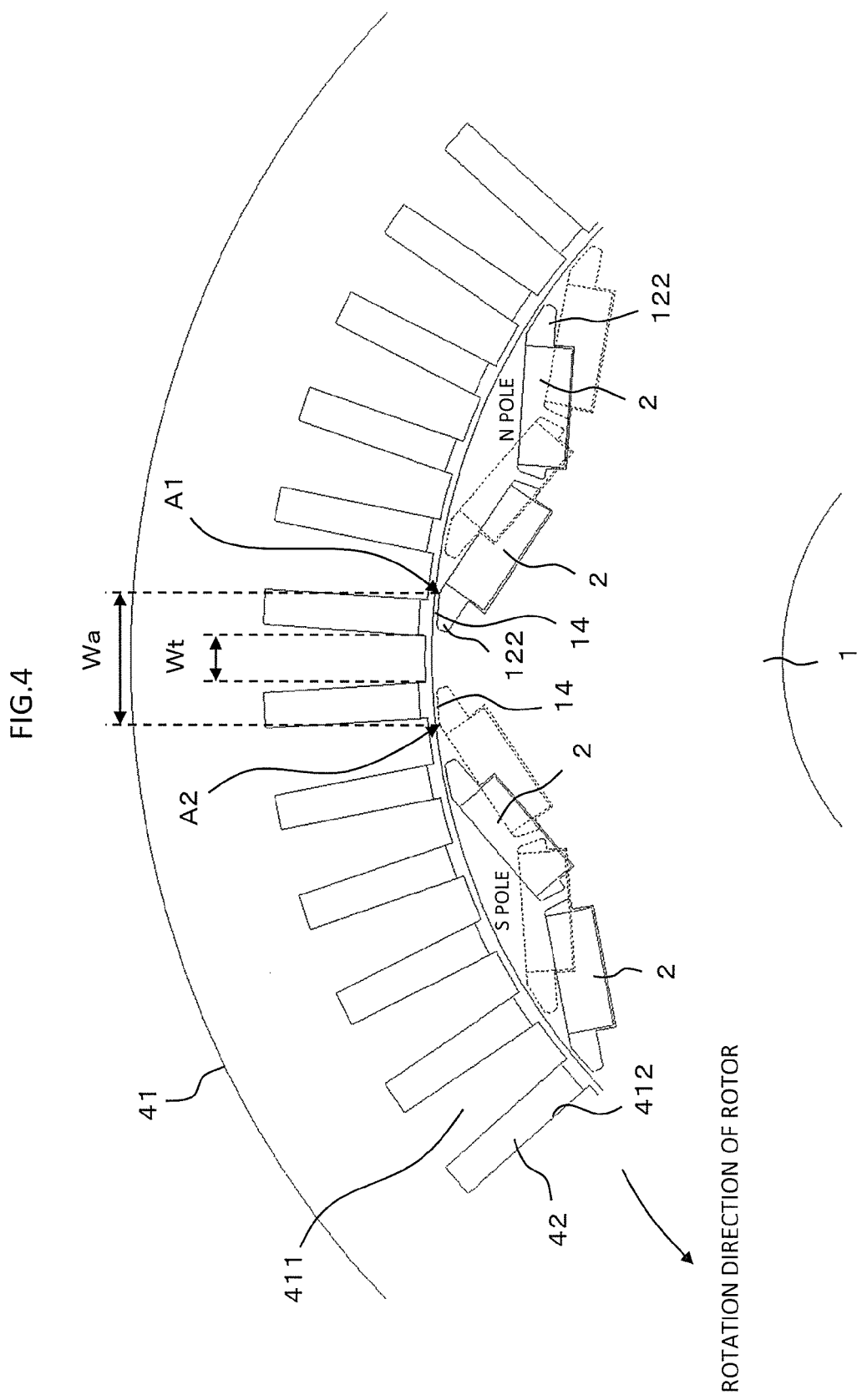
FIG. 4 is a main-part enlarged view illustrating the rotating electric machine of FIG. 3 as seen in an axial direction thereof.

FIG. 3 is a perspective view illustrating a rotating electric machine according to a second embodiment of the present invention. FIG. 4 is a main-part enlarged view illustrating the rotating electric machine of FIG. 3 as seen in an axial direction thereof. In FIGS. 3 and 4, the rotating electric machine includes a rotor 3, and a stator 4 arranged on a radially outer side of the rotor 3.

In the rotor 3, a pair of permanent magnets 2 arranged into a substantially V-shape in plan view is inserted into a pair of magnet through holes 12, to thereby form one magnetic pole. A desired number of the magnetic poles are formed by the pair of permanent magnets 2 in the circumferential direction of the rotor core 1. Each of the permanent magnets 2 that form two adjacent magnetic poles is inserted into the magnet through hole 12 so that the N pole and the S pole are inverted. Other components of the rotor 3 are similar to those of the rotor of the first embodiment.

Coils of the stator 4 are formed by distributed winding. The stator 4 includes an annular stator core 41 having a plurality of teeth 411 arranged in the circumferential direction with intervals, and stator coils 42 wound around the respective teeth 411. The stator coils 42 are arranged into alignment in respective slots 412 of the stator core 41.

The stator core 41 is divided into a plurality of segments in the circumferential direction. The stator 4 is assembled by inserting, after the stator coils 42 are aligned, the stator core 41 into the stator coils 42 from the radially outer side.

Further, the stator 4 includes a frame (not shown) for holding the stator core 41 divided into segments. The stator core 41 is constructed by laminating thin magnetic steel sheets.

The tooth 411 of the stator core 41 is formed so as to be reduced in circumferential width in a direction from a radially outer part of the tooth 411 to a radially inner part thereof. That is, the tooth 411 is formed so as to be reduced in circumferential width in a direction from a proximal end of the tooth 411 to a distal end thereof. Thus, a circumferential width Wt at the distal end of the tooth 411 is smaller than the circumferential width at the other part of the tooth 411.

In the rotating electric machine according to the second embodiment of the present invention, reluctance torque (torque generated due to only an attractive force between a pole formed by a rotating magnetic field of the stator 4 and a salient pole of the rotor 3) is generated as well as torque generated by the permanent magnets 2. Thus, the magnitude of torque of the rotating electric machine is determined by summing magnetic torque (torque generated due to an attractive force and a repulsive force between the pole formed by the rotating magnetic field of the stator 4 and the magnetic pole formed by the permanent magnets 2 of the rotor 3) and the reluctance torque.

Further, in the rotating electric machine according to the second embodiment of the present invention, the number of poles of the rotor 3 is 8, the number of slots is 48, and the number of slots for each pole and phase is 2. Skew angles between blocks of the rotor 3 are 1.875°, 4°, and 5.875° with respect to one of the blocks.

Among the plurality of divided blocks of the rotor 3, in a pair of blocks having the largest phase angle in a rotation direction, a distance Wa between a magnetic pole center-side end A1 of the bridge portion 14 arranged on an advancing side having the N magnetic pole formed in the block arranged on the most advancing side, and a magnetic pole center-side end A2 of the bridge portion 14 arranged on a retarding side having the S magnetic pole formed in the block arranged on the most retarding side is equal to or larger than the circumferential width Wt at the distal end of the tooth 411 of the stator core 41.

As described above, according to the rotating electric machine of the second embodiment of the present invention, it is possible to suppress a situation where a magnetic flux generated at the N magnetic pole arranged on the most advancing side flows into the S magnetic pole arranged on the most retarding side via a gap between the stator 4 and the rotor 3, and via the distal end of the tooth 411 of the stator core 41.

Therefore, it is possible to suppress increase in axial component of the magnetic flux, which does not contribute to the torque. Thus, the torque reduction of the rotating electric machine can be suppressed.

Further, as seen in the axial direction, there is no overlap between the N magnetic pole and the S magnetic pole in the entire rotor 3, and an opening angle of the N magnetic pole and the S magnetic pole in the entire rotor 3 is equal to or smaller than 180° in terms of an electric angle (more specifically, equal to or smaller than an angle obtained by subtracting an electric angle corresponding to one tooth 411 of the stator 4 from 180°). Thus, it becomes easier to carry out post-magnetization, which involves mounting non-magnetized permanent magnets 2 to the rotor core 1, laminating the blocks to construct the rotor 3, and then magnetizing the permanent magnets 2.

Further, the generation of the axial component of the magnetic flux is suppressed, and hence it is possible to reduce the loss of eddy current generated in the laminated stator core 41 and the laminated rotor core 1. Thus, the efficiency of the rotating electric machine can be enhanced.

Further, the coils of the stator 4 are formed by distributed winding, and hence the circumferential width Wt at the distal end of the tooth 411 can be reduced. Thus, it is possible to reduce the circumferential width of the bridge portion 14 that is necessary to prevent the magnetic flux leakage.

Third Embodiment

Figure 5:
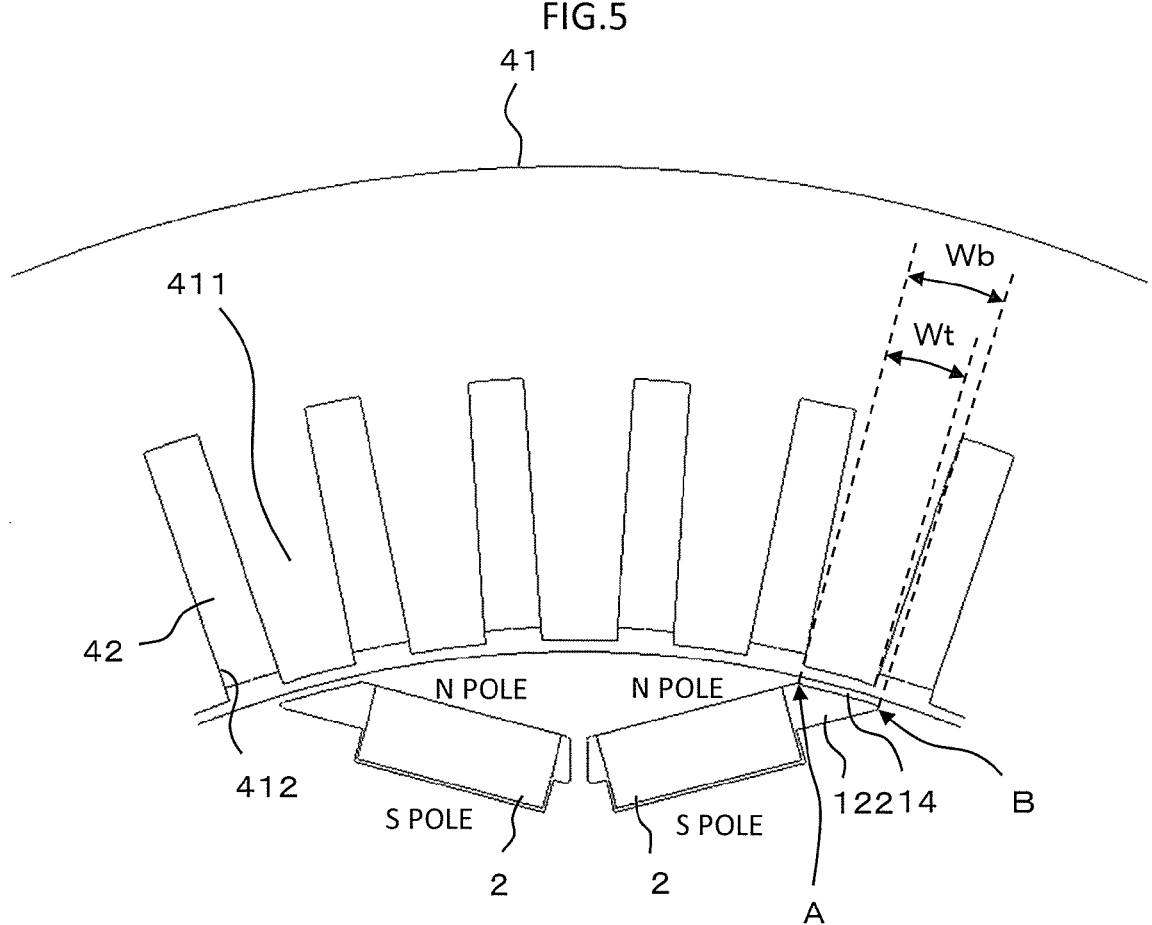
FIG. 5 is a main-part plan view illustrating a rotating electric machine as seen in an axial direction thereof according to a third embodiment of the present invention.

FIG. 5 is a main-part plan view illustrating a rotating electric machine as seen in an axial direction thereof according to a third embodiment of the present invention. In FIG. 5, in each of the plurality of blocks divided in the axial direction, a circumferential width Wb of the bridge portion 14 is equal to or larger than the circumferential width Wt at the distal end of the tooth 411 of the stator core 41 (Wb≥Wt).

The circumferential width Wb of the bridge portion 14 refers to a distance between the magnetic pole center-side end A of the bridge portion 14 and the magnetic pole outer-side end B of the bridge portion 14. Other components are similar to those of the second embodiment.

As described above, according to the rotating electric machine of the third embodiment of the present invention, it is possible to suppress a situation where a magnetic flux generated at the N magnetic pole of each of the blocks sneaks from the circumferential end of the N magnetic pole to the radially outer side of the bridge portion 14, which is positioned at the circumferential end of the N magnetic pole, via the gap between the stator 4 and the rotor 3, and via the distal end of the tooth 411 of the stator core 41, and flows into the radially inner part of the permanent magnet 2 that forms the N magnetic pole of the block, that is, the S pole of the permanent magnet 2. Thus, the magnetic flux leakage can be suppressed, with the result that the torque reduction of the rotating electric machine can be suppressed.

Fourth Embodiment

Figure 6:
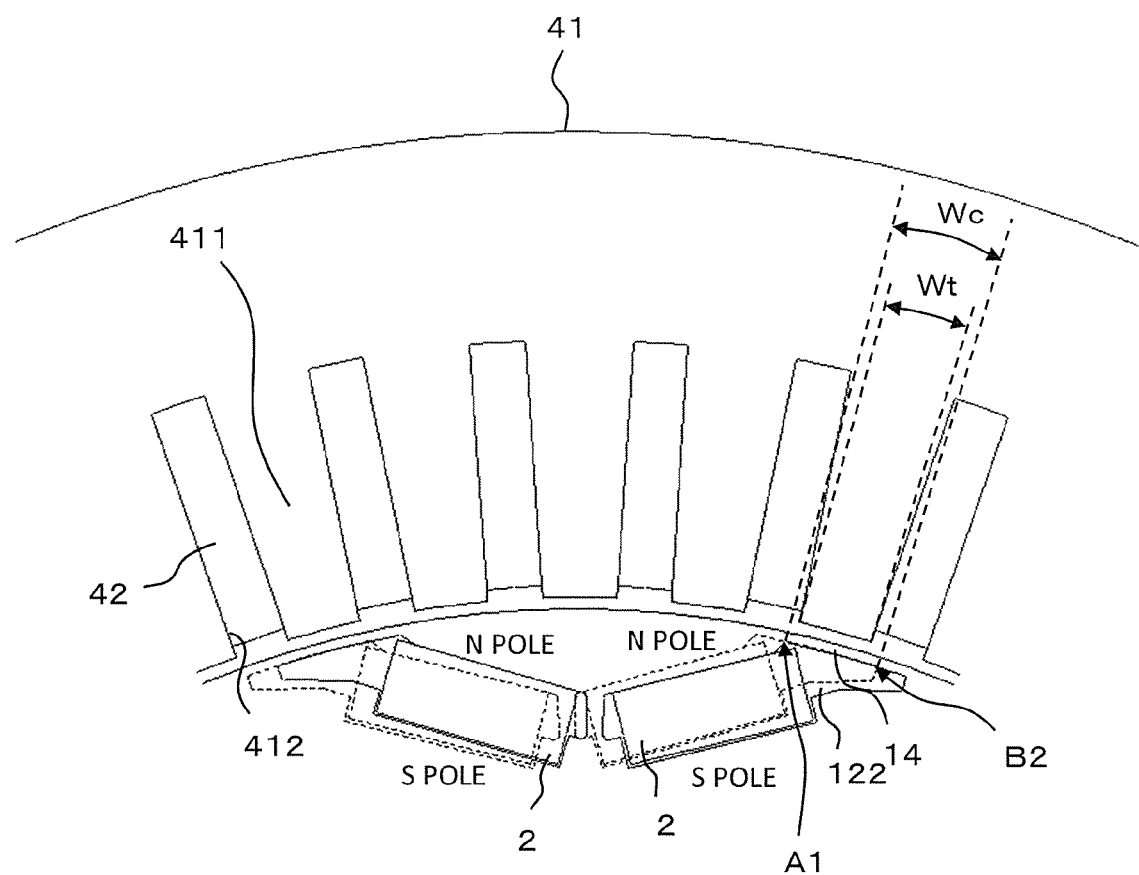
FIG. 6 is a main-part plan view illustrating a rotating electric machine as seen in an axial direction thereof according to a fourth embodiment of the present invention.

FIG. 6 is a main-part plan view illustrating a rotating electric machine as seen in an axial direction thereof according to a fourth embodiment of the present invention. In FIG. 6, the permanent magnet 2 and the magnet through hole 12 corresponding to one of the adjacent blocks are indicated by the solid line, and the permanent magnet 2 and the magnet through hole 12 corresponding to the other of the adjacent blocks are indicated by the broken line.

In FIG. 6, a distance We between the magnetic pole center-side end A1 of the bridge portion 14, which is arranged on the retarding side of the N magnetic pole of one of the adjacent blocks, and a magnetic pole outer-side end B2 of the bridge portion 14, which is arranged on the retarding side of the N magnetic pole of the other of the adjacent blocks, is equal to or larger than the circumferential width Wt at the distal end of the tooth 411 of the stator core 41. That is, when one of the adjacent blocks and the other of the adjacent blocks are laminated on each other in the axial direction, the circumferential dimension We of the axially overlapping part of one bridge portion 14 and the other bridge portion 14 is equal to or larger than the circumferential width Wt at the distal end of the tooth 411. Other components are similar to those of the third embodiment.

Figure 7:
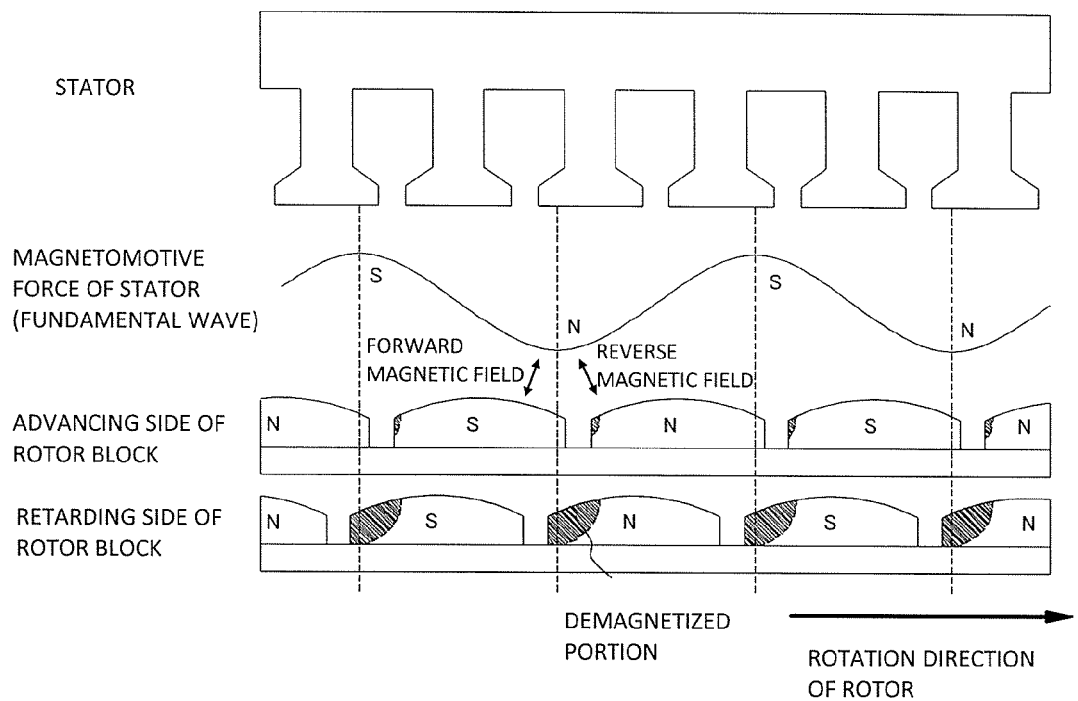
FIG. 7 is a schematic diagram illustrating a demagnetized portion of each permanent magnet of the rotor at the time of power running operation in a case where a stepped skew is formed in a rotor core.
Figure 8:
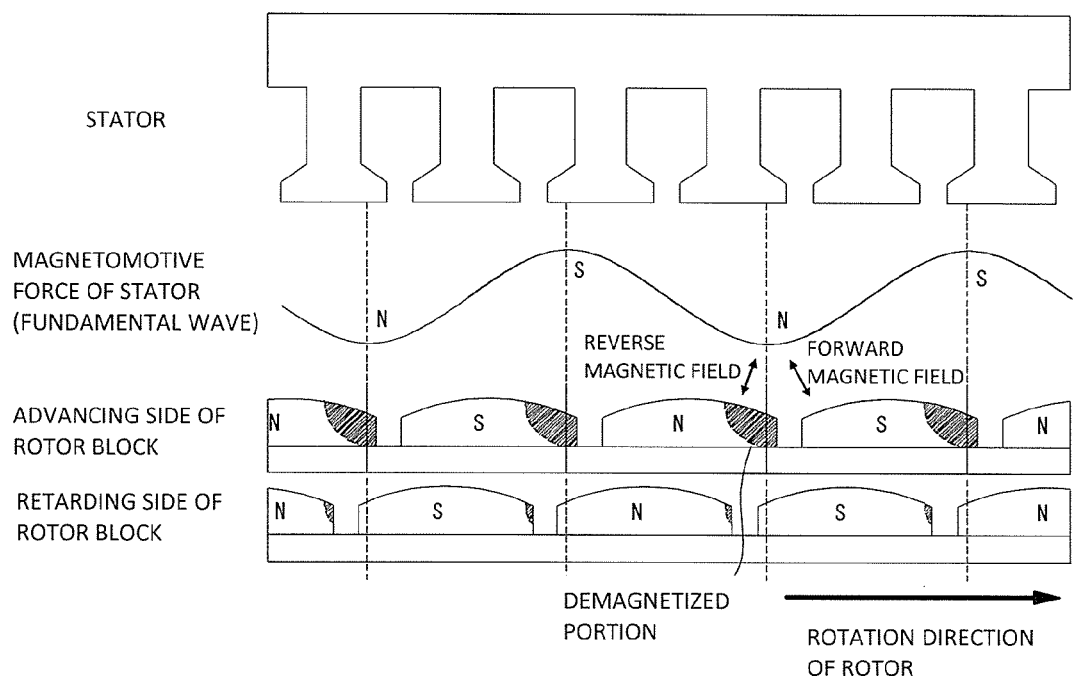
FIG. 8 is a schematic diagram illustrating a demagnetized portion of each permanent magnet of the rotor at the time of regenerative operation in the case where the stepped skew is formed in the rotor core.

As described above, according to the rotating electric machine of the fourth embodiment of the present invention, when the magnetic pole center-side end A1 of the bridge portion 14 of one of the adjacent blocks is arranged at a position opposed to the distal end of the tooth 411, the bridge portion 14 and the non-magnetic portion 122 of the other of the adjacent blocks are opposed to the distal end of the tooth 411, and the circumferential widths of the bridge portion 14 and the non-magnetic portion 122 are larger than the circumferential width Wt at the distal end of the tooth 411. Therefore, it is possible to suppress a situation where a magnetic flux generated at the N magnetic pole of one of the blocks sneaks from a circumferentially outer side of the N magnetic pole of the other of the blocks via the gap between the stator 4 and the rotor 3, and via the distal end of the tooth 411 of the stator core 41, and flows into the radially inner part of the permanent magnet 2 that forms the N magnetic pole of the other of the blocks, that is, the S pole of the permanent magnet 2 of the other of the blocks. Therefore, it is possible to suppress the increase in axial component of the magnetic flux, which does not contribute to the torque. Thus, the torque reduction of the rotating electric machine can be suppressed.
Fifth Embodiment FIG. 7 is a schematic diagram illustrating a demagnetized portion of each permanent magnet of the rotor at the time of power running operation in the case where the stepped skew is formed in the rotor core. FIG. 8 is a schematic diagram illustrating a demagnetized portion of each permanent magnet of the rotor at the time of regenerative operation in the case where the stepped skew is formed in the rotor core.

When the rotor core 1 is divided into the plurality of blocks in the axial direction and the stepped skew is formed in the rotor core 1, in the case of power running operation, the permanent magnets 2 of the block arranged on the most retarding side in the rotation direction are liable to be demagnetized, and in the case of regenerative operation, the permanent magnets 2 of the block arranged on the most advancing side in the rotation direction are liable to be demagnetized.

Further, as compared to the block arranged in the axially intermediate region, the block arranged at the axial end has a larger area of heat dissipation from the block to the outside, and hence the temperature of each permanent magnet 2 of the block arranged at the axial end is lower than the temperature of each permanent magnet 2 of the block arranged in the axially intermediate region.

Therefore, the block arranged on the most retarding side in the rotation direction and the block arranged on the most advancing side in the rotation direction are arranged at the axial ends of the rotor core 1. Other components are similar to those of the fourth embodiment.

As described above, according to the rotating electric machine of the fifth embodiment of the present invention, among the plurality of blocks divided in the axial direction, the temperature of each permanent magnet 2 of the block positioned at the axial end is lower than the temperature of each permanent magnet 2 of the block positioned in the axially intermediate region. Therefore, the block arranged on the most retarding side in the rotation direction and the block arranged on the most advancing side in the rotation direction are arranged at the axial ends, and hence the temperatures of the permanent magnets 2 of the blocks positioned at both the axial ends become lower than the temperature of each permanent magnet 2 of the block positioned in the axially intermediate region. Thus, the resistance to demagnetization of the permanent magnets 2 can be enhanced.

Figure 9:
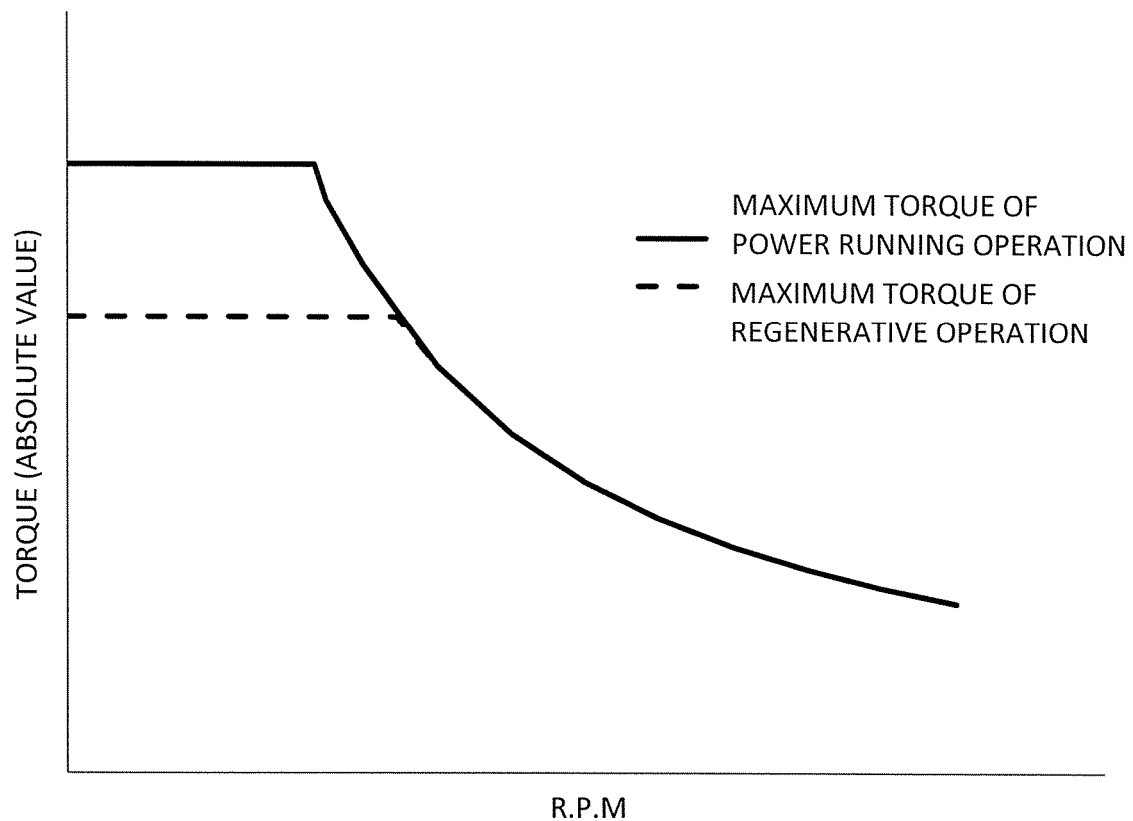
FIG. 9 is a graph showing a relationship between r.p.m. and torque in a case where an absolute value of the maximum torque of the power running operation is larger than an absolute value of the maximum torque of the regenerative operation.

Note that, when an absolute value of the maximum torque of the power running operation is larger than an absolute value of the maximum torque of the regenerative operation as shown in FIG. 9, the permanent magnets 2 of the block arranged on the most retarding side are most liable to be demagnetized, and hence the block arranged on the most retarding side in the rotation direction may be arranged at the axial end. Thus, the resistance to demagnetization of the permanent magnets 2 can be enhanced.

Figure 10:
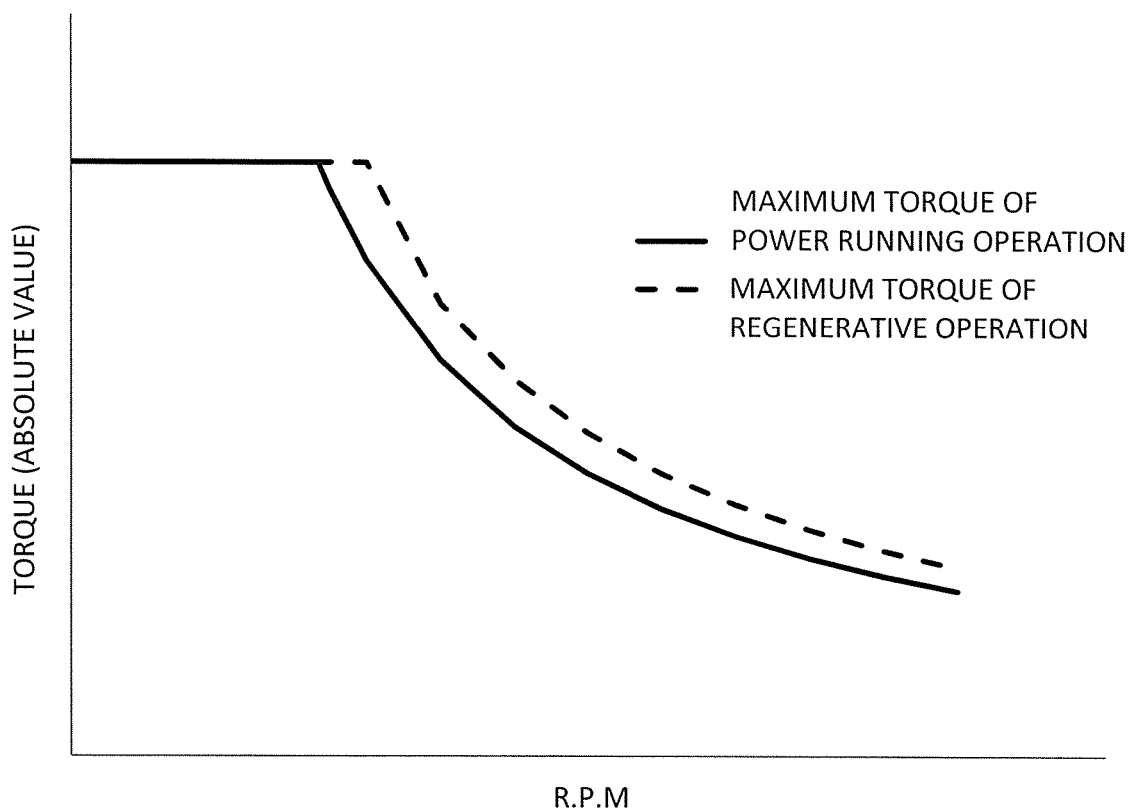
FIG. 10 is a graph showing a relationship between the r.p.m. and the torque in a case where the absolute value of the maximum torque of the regenerative operation is larger than the absolute value of the maximum torque of the power running operation.

When the absolute value of the maximum torque of the regenerative operation is larger than the absolute value of the maximum torque of the power running operation as shown in FIG. 10, on the other hand, the permanent magnets 2 of the block arranged on the most advancing side are most liable to be demagnetized, and hence the block arranged on the most advancing side in the rotation direction may be arranged at the axial end. Thus, the resistance to demagnetization of the permanent magnets 2 can be enhanced.

Note that, in the above-mentioned embodiments, the first pole is defined as the N pole and the second pole is defined as the S pole, but conversely, the first pole may be defined as the S pole and the second pole may be defined as the N pole.

What is claimed is:

1. A rotating electric machine comprising a rotor and a stator, the rotor comprising:
  a rotor core divided into a plurality of blocks in an axial direction of the rotor core,
    the plurality of blocks being arranged to have a phase angle therebetween in a circumferential direction of the rotor core so that a stepped skew is formed in the rotor core,
    the rotor core having a plurality of magnet through holes arrayed in the circumferential direction and formed in an outer circumferential region of the rotor core; and
  a plurality of permanent magnets inserted into the plurality of magnet through holes so that a first magnetic pole and a second magnetic pole are formed alternately in the circumferential direction on an outer circumferential surface of the rotor core, and the stator comprising:
  an annular stator core having a plurality of teeth arranged in the circumferential direction with intervals; and
  a conductive wire wound around each of the plurality of teeth, wherein each of the plurality of magnet through holes comprises:
  a magnet insertion portion into which each of the plurality of permanent magnets is inserted; and
  a non-magnetic portion provided on an outer side of the magnet insertion portion in the circumferential direction, for suppressing sneaking of a magnetic flux from a radially-outer side surface of each of the plurality of permanent magnets to a radially-inner side surface of each of the plurality of permanent magnets, wherein the non-magnetic portion has an outer circumferential inner wall formed along the outer circumferential surface of the rotor core so that a bridge portion is formed between the outer circumferential surface of the rotor core and the outer circumferential inner wall of the non-magnetic portion, wherein a bridge angle, which is an angle between both circumferential ends of the bridge portion with a rotation center of the rotor core set as a vertex of the angle, is equal to or larger than a skew angle, which is the phase angle between the plurality of blocks adjacent to each other, and wherein, in the plurality of blocks that are largest in the phase angle in a rotation direction, a distance between a magnetic pole center-side end of the bridge portion arranged on an advancing side having the first magnetic pole formed in one of the plurality of blocks arranged on a most advancing side, and a magnetic pole center-side end of the bridge portion arranged on a retarding side having the second magnetic pole formed in one of the plurality of blocks arranged on a most retarding side, is equal to or larger than a circumferential width at a distal end of each of the plurality of teeth.

2. A rotating electric machine according to claim 1, wherein a circumferential width of the bridge portion is equal to or larger than a circumferential width at a distal end of each of the plurality of teeth.

3. A rotating electric machine comprising a rotor and a stator, the rotor comprising:
a rotor core divided into a plurality of blocks in an axial direction of the rotor core,
the plurality of blocks being arranged to have a phase angle therebetween in a circumferential direction of the rotor core so that a stepped skew is formed in the rotor core,
the rotor core having a plurality of magnet through holes arrayed in the circumferential direction and formed in an outer circumferential region of the rotor core; and
a plurality of permanent magnets inserted into the plurality of magnet through holes so that a first magnetic pole and a second magnetic pole are formed alternately in the circumferential direction on an outer circumferential surface of the rotor core, and the stator comprising:
an annular stator core having a plurality of teeth arranged in the circumferential direction with intervals; and
a conductive wire wound around each of the plurality of teeth, wherein each of the plurality of magnet through holes comprises:
a magnet insertion portion into which each of the plurality of permanent magnets is inserted; and
a non-magnetic portion provided on an outer side of the magnet insertion portion in the circumferential direction, for suppressing sneaking of a magnetic flux from a radially-outer side surface of each of the plurality of permanent magnets to a radially-inner side surface of each of the plurality of permanent magnets, wherein the non-magnetic portion has an outer circumferential inner wall formed along the outer circumferential surface of the rotor core so that a bridge portion is formed between the outer circumferential surface of the rotor core and the outer circumferential inner wall of the non-magnetic portion, wherein a bridge angle, which is an angle between both circumferential ends of the bridge portion with a rotation center of the rotor core set as a vertex of the angle, is equal to or larger than a skew angle, which is the phase angle between the plurality of blocks adjacent to each other, and wherein, when a first block of the plurality of blocks is adjacent to a second block of the plurality of blocks and the first block and the second block are laminated on each other in the axial direction, a dimension in the circumferential direction of an axially overlapping part of the bridge portion of the first block and the bridge portion of the second block is equal to or larger than a circumferential width at a distal end of each of the plurality of teeth.

4. A rotating electric machine according to claim 1, wherein a coil of the stator is formed by distributed winding.

5. A rotating electric machine according to claim 1, wherein one of the plurality of blocks, which is arranged on a most retarding side in a rotation direction, and one of the plurality of blocks, which is arranged on a most advancing side in the rotation direction, are arranged at axial ends of the rotor core.

6. A rotating electric machine according to claim 1, wherein, when maximum torque of a power running operation is larger than maximum torque of a regenerative operation, one of the plurality of blocks, which is arranged on a most retarding side in a rotation direction, is arranged at an axial end of the rotor core.

7. A rotating electric machine according to claim 1, wherein, when maximum torque of a regenerative operation is larger than maximum torque of a power running operation, one of the plurality of blocks, which is arranged on a most advancing side in a rotation direction, is arranged at an axial end of the rotor core.

* * * * *